United States Patent
Takata et al.

(10) Patent No.: US 9,554,376 B2
(45) Date of Patent: *Jan. 24, 2017

(54) APPARATUS AND METHOD FOR GENERATING AND TRANSMITTING REFERENCE SIGNAL IN RADIO COMMUNICATION

(71) Applicant: Sun Patent Trust, New York, NY (US)

(72) Inventors: Tomofumi Takata, Ishikawa (JP); Daichi Imamura, Beijing (CN); Seigo Nakao, Singapore (SG); Sadaki Futagi, Ishikawa (JP); Takashi Iwai, Ishikawa (JP); Yoshihiko Ogawa, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/057,969

(22) Filed: Mar. 1, 2016

(65) Prior Publication Data

US 2016/0183246 A1 Jun. 23, 2016

Related U.S. Application Data

(63) Continuation of application No. 14/858,333, filed on Sep. 18, 2015, now Pat. No. 9,313,795, which is a
(Continued)

(30) Foreign Application Priority Data

Jan. 4, 2008 (JP) .................................. 2008-000197

(51) Int. Cl.
*H04W 72/04* (2009.01)
*H04J 13/00* (2011.01)
(Continued)

(52) U.S. Cl.
CPC ...... *H04W 72/0413* (2013.01); *H04J 13/0003* (2013.01); *H04J 13/0059* (2013.01);
(Continued)

(58) Field of Classification Search
CPC .... H04W 72/082; H04J 13/0059; H04J 13/10; H04L 5/0048; H04L 25/0228
See application file for complete search history.

(56) References Cited

U.S. PATENT DOCUMENTS

| | | | |
|---|---|---|---|
| 7,529,179 | B1 | 5/2009 | Lee et al. |
| 7,778,151 | B2 | 8/2010 | Bertrand et al. |

(Continued)

FOREIGN PATENT DOCUMENTS

| | | |
|---|---|---|
| EP | 2 187 548 A1 | 5/2010 |
| EP | 2 207 291 A1 | 7/2010 |
| JP | 2007-325071 A | 12/2007 |

OTHER PUBLICATIONS

Extended European Search Report, dated May 29, 2013, for corresponding European Application No. 12184671.1-1852 / 2560308, 8 pages.

(Continued)

*Primary Examiner* — Jay P Patel
(74) *Attorney, Agent, or Firm* — Seed Intellectual Property Law Group LLP

(57) ABSTRACT

It is possible to provide a radio communication terminal device and a radio transmission method which can improve reception performance of a CQI and a reference signal. A phase table storage unit stores a phase table which correlates the amount of cyclic shift to complex coefficients {w1, w2} to be multiplied on the reference signal. A complex coefficient multiplication unit reads out a complex coefficient corresponding to the amount of cyclic shift indicated by resource allocation information, from the phase table storage (Continued)

unit and multiplies the read-out complex coefficient on the reference signal so as to change the phase relationship between the reference signals in a slot.

6 Claims, 16 Drawing Sheets

Related U.S. Application Data continuation of application No. 14/699,890, filed on Apr. 29, 2015, now Pat. No. 9,167,589, which is a continuation of application No. 14/520,170, filed on Oct. 21, 2014, now Pat. No. 9,049,062, which is a continuation of application No. 14/246,497, filed on Apr. 7, 2014, now Pat. No. 8,913,480, which is a continuation of application No. 13/752,126, filed on Jan. 28, 2013, now Pat. No. 8,750,090, which is a continuation of application No. 12/811,189, filed as application No. PCT/JP2008/004006 on Dec. 26, 2008, now Pat. No. 8,503,285.

(51) Int. Cl.
| | | |
|---|---|---|
| H04L 25/02 | (2006.01) | |
| H04J 13/10 | (2011.01) | |
| H04W 72/08 | (2009.01) | |
| H04L 27/26 | (2006.01) | |
| H04J 11/00 | (2006.01) | |
| H04L 5/00 | (2006.01) | |
| H04W 88/02 | (2009.01) | |

(52) U.S. Cl.
CPC .......... *H04J 13/0074* (2013.01); *H04J 13/10* (2013.01); *H04L 5/0048* (2013.01); *H04L 5/0057* (2013.01); *H04L 25/0204* (2013.01); *H04L 25/0208* (2013.01); *H04L 25/0228* (2013.01); *H04L 27/2695* (2013.01); *H04W 72/082* (2013.01); *H04J 11/00* (2013.01); *H04J 13/0055* (2013.01); *H04L 5/0007* (2013.01); *H04W 88/02* (2013.01)

(56) References Cited

U.S. PATENT DOCUMENTS

| 8,094,638 | B2 | 1/2012 | Muharemovic et al. |
|---|---|---|---|
| 8,116,195 | B2 | 2/2012 | Hou et al. |
| 8,144,570 | B2 | 3/2012 | Tiirola et al. |
| 8,149,767 | B2 | 4/2012 | Zhang et al. |
| 8,160,018 | B2 | 4/2012 | Zhang et al. |
| 8,179,857 | B2 | 5/2012 | Kwon et al. |
| 8,218,521 | B2 | 7/2012 | Koyanagi |
| 8,379,590 | B2 | 2/2013 | Hooli et al. |
| 8,451,783 | B2 | 5/2013 | Kim et al. |
| 8,681,766 | B2 | 3/2014 | Zhang et al. |
| 8,699,426 | B2 | 4/2014 | Gaal et al. |
| 2004/0165650 | A1 | 8/2004 | Miyazaki et al. |
| 2004/0170157 | A1 | 9/2004 | Kim et al. |
| 2006/0050799 | A1 | 3/2006 | Hou et al. |
| 2007/0183386 | A1 | 8/2007 | Muharemovic et al. |
| 2007/0189404 | A1 | 8/2007 | Baum et al. |
| 2007/0242764 | A1 | 10/2007 | Anigstein et al. |
| 2007/0253465 | A1 | 11/2007 | Muharemovic et al. |
| 2008/0075060 | A1 | 3/2008 | Tiirola et al. |
| 2008/0168114 | A1* | 7/2008 | Han ................... H04J 13/0062 708/209 |
| 2009/0092148 | A1 | 4/2009 | Zhang et al. |
| 2009/0231993 | A1 | 9/2009 | Zhang et al. |
| 2009/0232065 | A1 | 9/2009 | Zhang et al. |
| 2009/0303960 | A1* | 12/2009 | Qu ..................... H04B 7/022 370/330 |
| 2010/0074343 | A1 | 3/2010 | Gaal et al. |
| 2010/0086082 | A1* | 4/2010 | Ogawa ............... H04J 13/0003 375/308 |
| 2010/0284394 | A1 | 11/2010 | Takata et al. |
| 2012/0014243 | A1 | 1/2012 | Bertrand et al. |

OTHER PUBLICATIONS

Extended European Search report, dated Jul. 18, 2014, for corresponding European Application No. 13178987.7-1852 /2661003, 8 pages.
International Search Report, dated Mar. 31, 2009, for corresponding International Application No. PCT/JP2008/004006, 4 pages.
Kakura, "Evolved UTRA Nobori Seigyo Joho ni Kansura Signaling—ho Oyobi sono Tokucho—Signalling Method and Features for Uplink Control Information on Evolved UTRA," Proceedings of the IEICE Communications Society Conference 1, Sep. 2008, BS-4-7, pp. S43-S44.
H. Katsuragawa, "LTE no Nobori Sancho Shingo—Uplink Reference Signal for LTE," Proceedings of the IEICE Communications Society Conference 1, Sep. 2008, BS-4-6, pp. S41-S42.
KDDI, NTT DoCoMo, "CDMA based Multiplexing of ACK/NACK and CQI Control Information in E-UTRA Uplink," R1-070521 (Original R1-063579), 3GPP TSG RAN WG1 Meeting #47bis, Sorrento, Italy, Jan. 15-19, 2007, 4 pages.
Motorola, "Uplink Transmission of CQI and ACK/NACK," R1-074010, 3GPP TSG RAN1#50-bis, Agenda Item 6.2.4, Shanghai, China, Oct. 8-12, 2007, 5 pages.
Nakao et al., "Evolved UTRA Nobori Seigyo Channel ni Okeru Scramble no Ichikento—Considerations on the scrambling for Evolved UTRA uplink control channel," IEICE Technical Report, vol. 108, No. 249, Oct. 2008, RCS2008-112, pp. 55-60.
Panasonic, "Signaling parameters for UL ACK/NACK resources," R1-073616, 3GPP TSG RAN WG1 Meeting #50, Agenda Item 7.2.4 Uplink Control Channel, Athens, Greece, Aug. 20-24, 2007, 3 pages.
Panasonic, "Variable Phase Definition of the Reference Signal for CQI in PUCCH," R1-073621, 3GPP TSG RAN WG1 Meeting #50, Agenda Item 7.2.4 Uplink Control Channel, Athens, Greece, Aug. 20-24, 2007, 5 pages.
Panasonic, NTT DoCoMo, "Necessity of the scrambling for ACK/NACK on PUCCH," R1-080978, 3GPP TSG RAN WG1 Meeting #52, Agenda Item 6.1.4 Uplink Control Signaling, Sorrento, Italy, Feb. 11-15, 2008, 6 pages.
Panasonic, NTT DoCoMo, "Necessity of the Scrambling for Reference Signal of CQI in PUCCH," R1-081199, 3GPP TSG RAN WG1 Meeting #52bis, Agenda Item 6.1.4 Uplink Control Signaling, Shenzhen, China, Mar. 31-Apr. 4, 2008, 6 pages.
Samsung, "Selection of Orthogonal Cover Walsh Codes for High Speed UL ACK," R1-074091, 3GPP TSG RAN WG1 Meeting #50bis, Agenda Item 6.2.4, Shanghai, China, Oct. 8-12, 2007, 5 pages.
Samsung, "Multiplexing CQI and ACK/NAK Transmission in E-UTRA UL," R1-074097, 3GPP TSG RAN WG1 Meeting #50bis, Agenda Item 6.2.4, Shanghai, China, Oct. 8-12, 2007, 4 pages.
Samsung, "Slot-level UL ACK/NACK Cyclic Shift/Orthogonal Cover Remapping," R1-074788, 3GPP TSG RAN WG1 Meeting #51, Agenda Item 6.2.4, Jeju, Korea, Nov. 5-9, 2007, 6 pages.
Supplementary European Search Report, dated Jun. 8, 2011, for corresponding European Application No. 08870529, 1 page.
Texas Instruments, "Simultaneous CQI and ACK/NAK Transmission in Uplink," R1-074141, 3GPP TSG RAN WG1 #50b, Agenda Item 6.2.4, Shanghai, China, Oct. 8-12, 2007, 5 pages.

* cited by examiner

APPARATUS AND METHOD FOR GENERATING AND TRANSMITTING REFERENCE SIGNAL IN RADIO COMMUNICATION

BACKGROUND

Technical Field

The present invention relates to a radio communication terminal apparatus and a radio transmission method.

Description of the Related Art

3GPP-LTE (3rd Generation Partnership Project-Long Term Evolution) has discussed a transmission method for uplink control channels in different two ways: "in a case in which uplink control signals and uplink data are transmitted simultaneously"; and "in a case in which uplink control signals and uplink data are not transmitted simultaneously."

When uplink control signals and uplink data are transmitted simultaneously, preferably, control signals are transmitted in synchronization with data using uplink resources designated by the base station. Meanwhile, when uplink data signals are not permitted to be transmitted and therefore uplink control signals are not transmitted in synchronization with uplink data, terminals transmit uplink control signals using "a band for transmitting uplink control signals" reserved in advance.

A band (PUCCH: Physical Uplink Control Channel) that is reserved for transmitting uplink control signals (e.g. ACK/NACKs and CQIs) by 3GPP-LTE is shown in FIG. 1. In FIG. 1, the vertical axis represents the system bandwidth of which values unique to the base station, for example, 5 MHz or 10 MHz are set, and the horizontal axis represents time. One subframe length is 1 ms, and PUCCH transmission is performed per subframe. In addition, one subframe is composed of two slots. As shown in FIG. 1, frequency resources allocated to control signals are frequency-hopped at the time slots are switched, so that it is possible to obtain the frequency diversity effect.

Moreover, FIG. 2 is a drawing conceptually showing a state in which terminals transmit CQIs using a band reserved by the system. Here, each ZAC sequence in the figure has a sequence length of twelve in the time domain, and has a characteristic of constant Amplitude (CA) in the frequency domain and the characteristic of zero auto correlation (ZAC) in the time domain.

Each slot of a subframe for transmitting CQIs is formed by seven SC-FDMA (Single Carrier-Frequency Division Multiple Access) symbols. Hereinafter SC-FDMA symbols in a slot are referred to as the first, second, . . . , seventh SC-FDMA symbols. CQI signals are placed in the first, third, fourth, fifth and seventh SC-FDMA symbols and reference signals (RSs) for demodulating CQIs are placed in the second and sixth SC-FDMA symbols. As shown in FIG. 2, each of five CQI symbols is primarily spread by a ZAC sequence in the frequency domain, and placed in a SC-FDMA symbol (or "LB": Long Block). In addition, reference signals obtained by performing the IFFT (Inverse Fast Fourier Transform) of ZAC sequences represented in the frequency domain are placed in the second and sixth SC-FDMA symbols.

ZAC sequences and amounts of cyclic shift used in each terminal are determined according to commands from the base station. Here, although cyclic shifting means transforming the waveform of ZAC sequences transformed in the time domain using cyclic shifting, an equivalent processing is possible by phase rotation in the frequency domain, so that a state in which cyclic shift processing is performed in the frequency domain is shown here. In addition, it has been determined that CQIs from different terminals are code-multiplexed (CDM). To be more specific, CQI signals from different terminals are transmitted through the same ZAC sequences having different amounts of cyclic shift. On the base station side, it is possible to separate CQI signals from terminals by taking into account of the amount of cyclic shift per terminal after correlation processing with ZAC sequences. That is, CQIs from different terminals are code-multiplexed.

In addition, 3GPP-LTE has determined that, when one terminal transmits CQIs and response signals (ACK/NACKs) simultaneously, response signals may be transmitted using reference signals for demodulating CQIs. The details are described later.

FIG. 3 is a drawing showing the characteristic of ZAC sequences used to primarily spread CQIs in the time domain. Each ZAC sequence has a sequence length of twelve in the time domain, and therefore there are maximum twelve patterns of cyclic shift. Since the cross-correlation between the same ZAC sequences having different amounts of cyclic shift is approximately zero, it is possible to separate signals spread through the same ZAC sequences having different amounts of cyclic shift in the time domain almost without interference.

However, although in an ideal environment as shown in FIG. 3, it is possible to separate signals spread by means of ZAC sequences with different amounts of cyclic shift without interference from each other by correlation processing on the receiver side, those signals do not necessarily reach the base station side simultaneously, due to the influence of channel delay, difference between timings terminals transmit signals, frequency offset and so forth. By this influence of timing difference, for example, as shown in FIG. 4, separation characteristics of signals spread by sequences corresponding to adjacent cyclic shifts are likely to deteriorate. In addition, the difference in transmission timings of terminals exerts a negative influence on the orthogonality between adjacent cyclic shifts of ZAC sequences. For example, in FIG. 3, assuming that amounts of cyclic shift obtained by shifting sequences one by one (twelve sequences of cyclic shift indexes i=0 to 12) is allocated to each terminal, it is possible to multiplex maximum twelve terminals according to differences in the amount of cyclic shift. That is, it is possible to code-multiplex twelve CQI signals using one frequency resource.

Methods of transmitting CQIs in a PUCCH field reserved for transmitting control information are described in non-patent documents 1 to 3. With Non-Patent document 1, when only CQIs are transmitted, the phase difference between two reference signals in a slot is fixed regardless of the amount of cyclic shift as shown in FIG. 2.

In addition, with non-patent documents 2 and 3, when CQIs and response signals are transmitted simultaneously, response signals are represented by multiplying CQI demodulating reference signals by complex coefficients {w1, w2} As shown in FIG. 5 That is, a case of {w1, w2}={+1, +1} represents ACK information and a case of {w1, w2}={+1, −1} represents NACK information. In addition, the relationship between ACK/NACKs and {w1, w2} is not changed regardless of the amount of cyclic shift.

Non-Patent Document 1: R1-074010, Motorola, "Uplink Transmission of CQI and ACK/NAK", 3GPP TSG RAN1 #50-bis, Shanghai, China, Oct. 8-12, 2007 Non-Patent Document 2: R1-074097, Samsung, "Multiplexing CQI and ACK/NAK Transmission in E-UTRA UL", 3GPP TSG RAN WG1 #50b is, Shanghai, China, Oct. 8-12, 2007

Non-Patent Document 3: R1-074141, Texas Instruments, "Simultaneous CQI and ACK/NACK Transmission in Uplink", 3GPP TSG RAN WG1 #50b, Shanghai, China, Oct. 8-12, 2007

DISCLOSURE OF INVENTION

Problems to be Solved by the Invention

According to 3GPP-LTE, as described above, CQI signals from each terminal are multiplexed in different amounts of cyclic shift as shown in FIG. 6. That is, CQI signals are identified based solely on the difference in the amount of cyclic shift. In an ideal environment, since ZAC sequences corresponding to different amounts of cyclic shift are allocated to CQI signals from each terminal, it is possible to separate signals without interference.

However, the orthogonality of cyclic shift sequences is broken down depending on channel delay conditions and so forth as described above. FIG. 7 shows a delay profile in the time domain after the base station receives CQI signals transmitted from plurality of terminals and performs correlation processing. As shown in FIG. 7, if the orthogonality of cyclic shift sequences is broken down, interference occurs between CQI signals allocated to adjacent cyclic shift sequences. This interference between cyclic shift sequences exerts a negative influence on CQI signals and reference signals, and therefore, the accuracy of channel estimation and the CQI demodulation performance deteriorate.

It is therefore an object of the present invention to provide a radio communication terminal apparatus and a radio transmission method that improve the capability to receive CQIs and reference signals.

Means for Solving the Problem

The radio communication terminal apparatus according to the present invention adopts a configuration including: a reference signal generating section that generates a reference signal by controlling a phase difference between a plurality of reference signals included in a slot in accordance with a cyclic shift index allocated to the radio communication terminal apparatus; and a transmitting section that transmits the generated reference signal.

The radio transmission method according to the present invention includes the steps of: generating a reference signal by controlling a phase difference between a plurality of reference signals included in a slot in accordance with a cyclic shift index allocated to a radio communication terminal apparatus; and transmitting the generated reference signal.

Advantageous Effects of Invention

According to the present invention, it is possible to improve the capability to receive CQIs and reference signals.

BEST MODE FOR CARRYING OUT THE INVENTION

Figure 1:
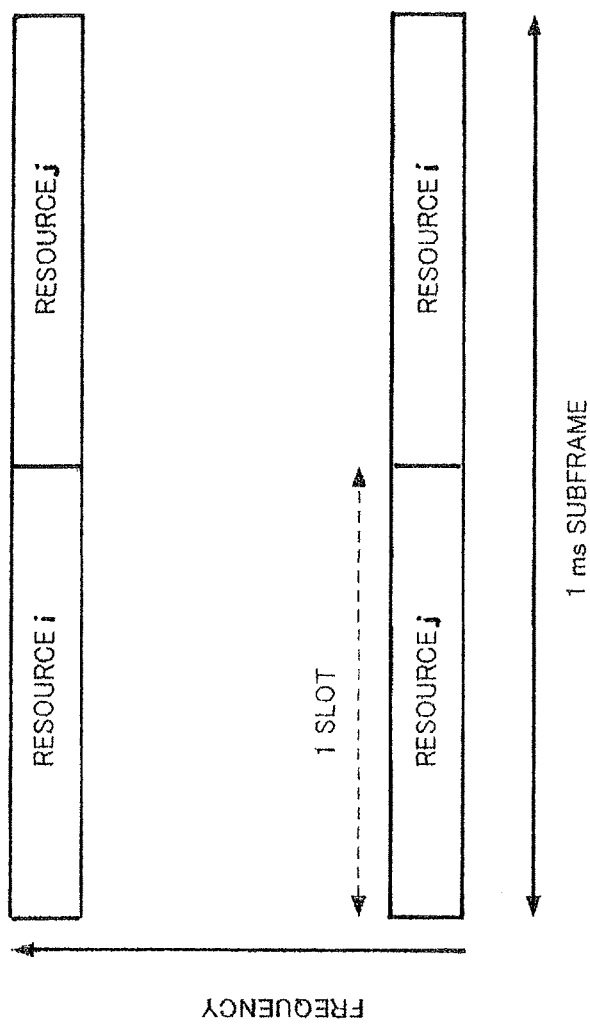
FIG. 1 is a drawing showing a band reserved for uplink control signal transmission.
Figure 2:
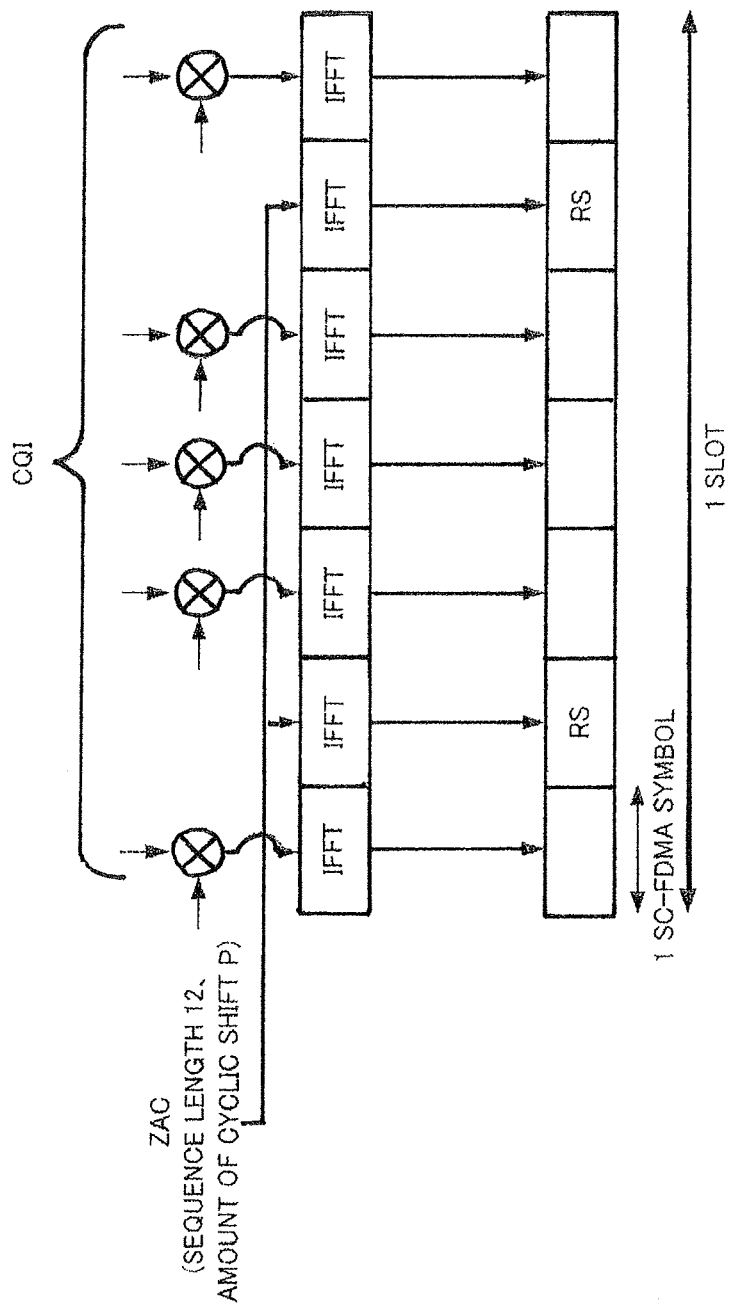
FIG. 2 is a drawing conceptually showing a state in which terminals transmit CQIs using a band reserved by the system.
Figure 3:
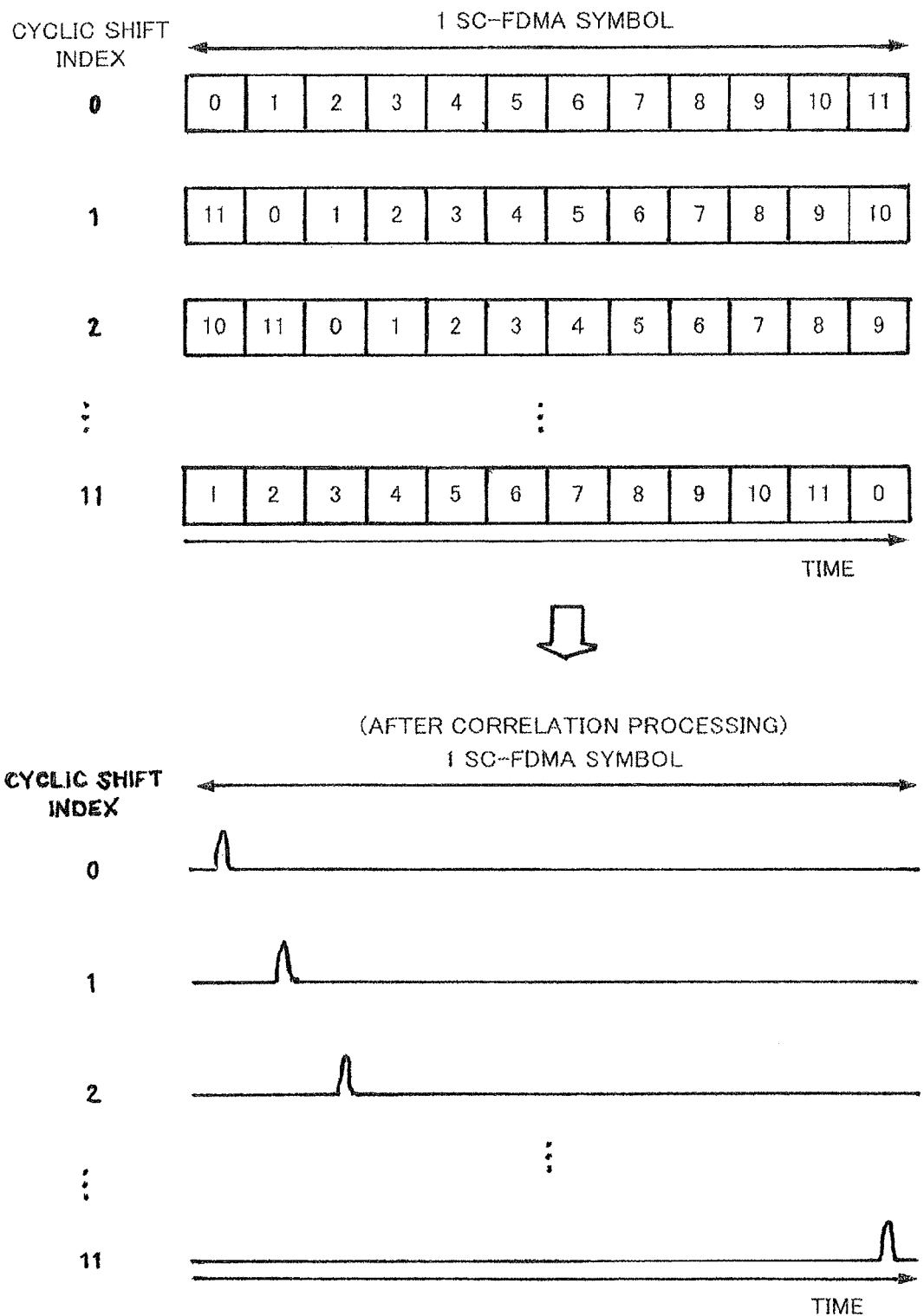
FIG. 3 is a drawing showing the characteristic of ZAC sequences used to CQI primary spread.
Figure 4:
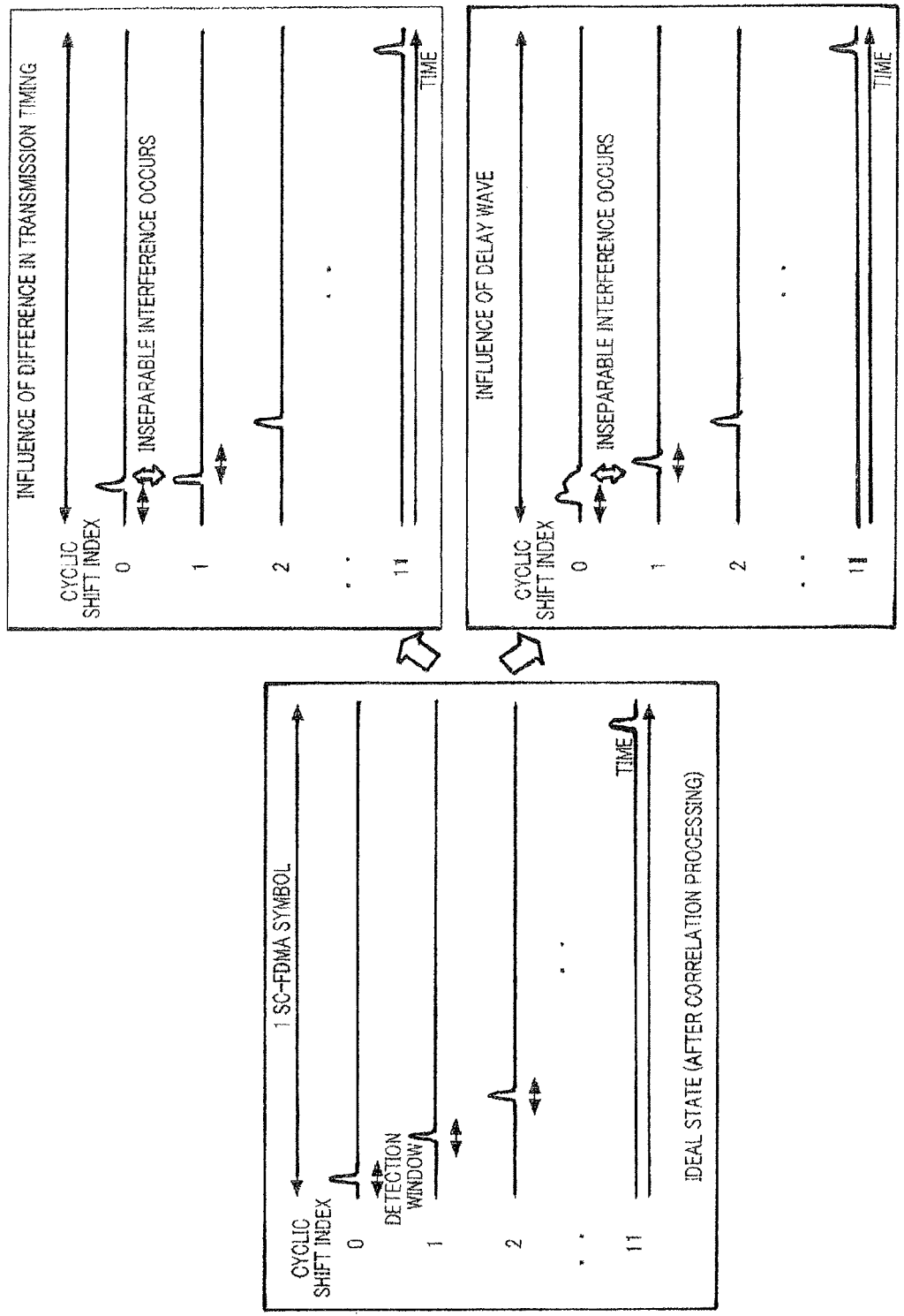
FIG. 4 is a drawing showing states in which separation characteristics of signals spread by adjacent cyclic shift sequences deteriorate.
Figure 5:
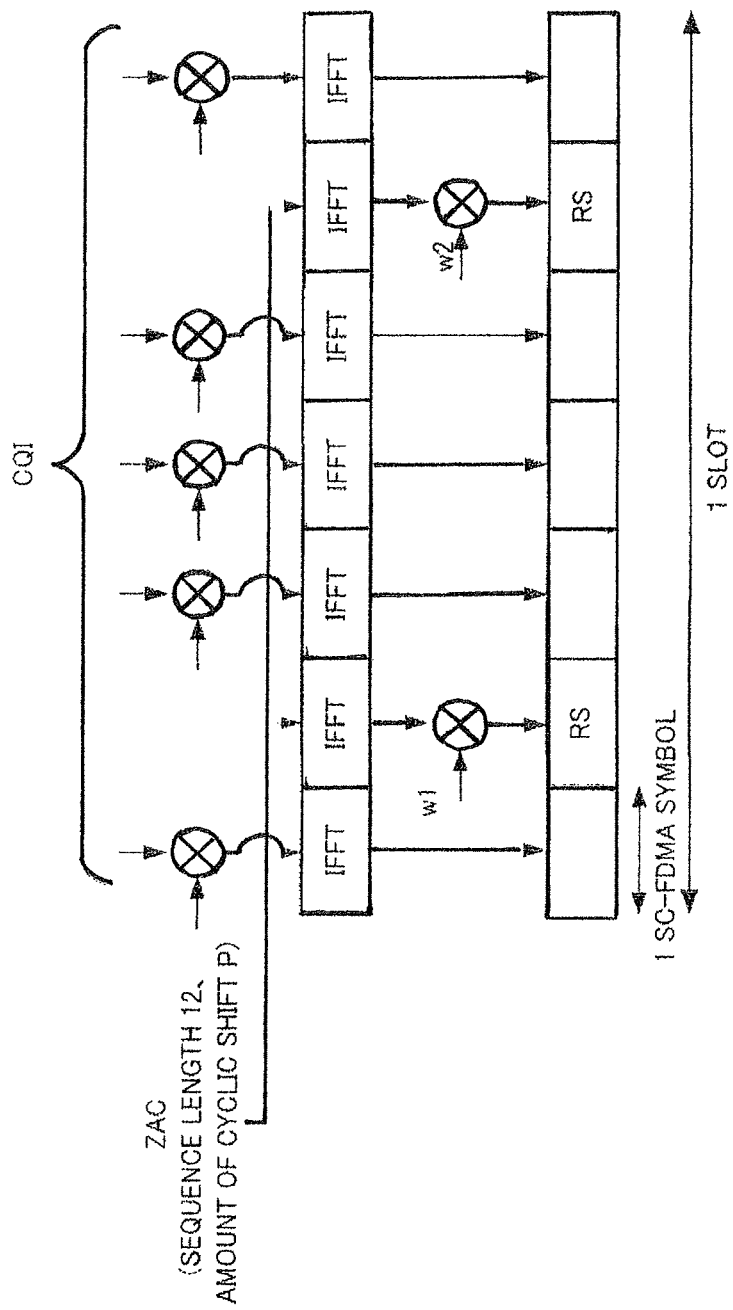
FIG. 5 is a drawing conceptually showing a state in which CQIs and reference signals are transmitted simultaneously.
Figure 6:
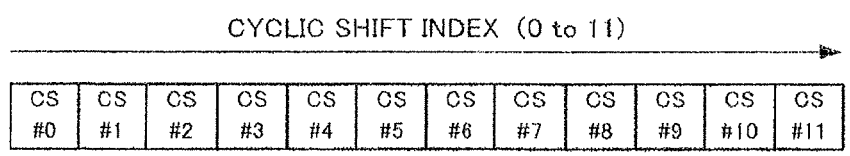
FIG. 6 is a drawing showing a state in which CQI signals from each terminal are multiplexed in different amounts of cyclic shift.
Figure 7:
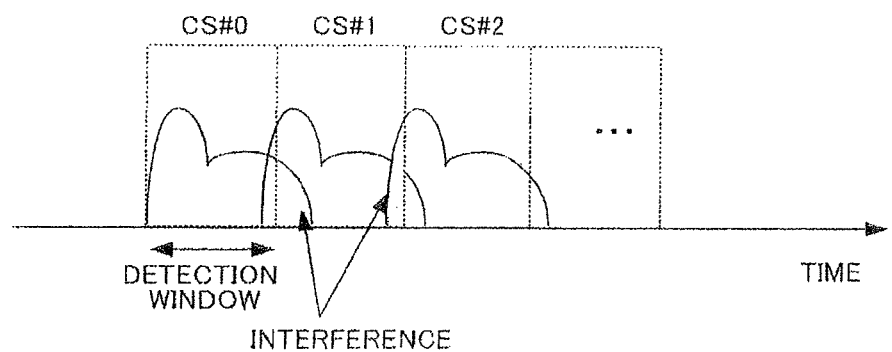
FIG. 7 is a drawing showing a state in which interference occurs between CQI signals allocated to adjacent cyclic shift sequences.

Now, embodiments of the present invention will be described in detail with reference to the accompanying drawings. Here, with embodiments, components with the same functions will be assigned the same reference numerals and overlapping descriptions will be omitted.

Embodiment 1

Figure 8:
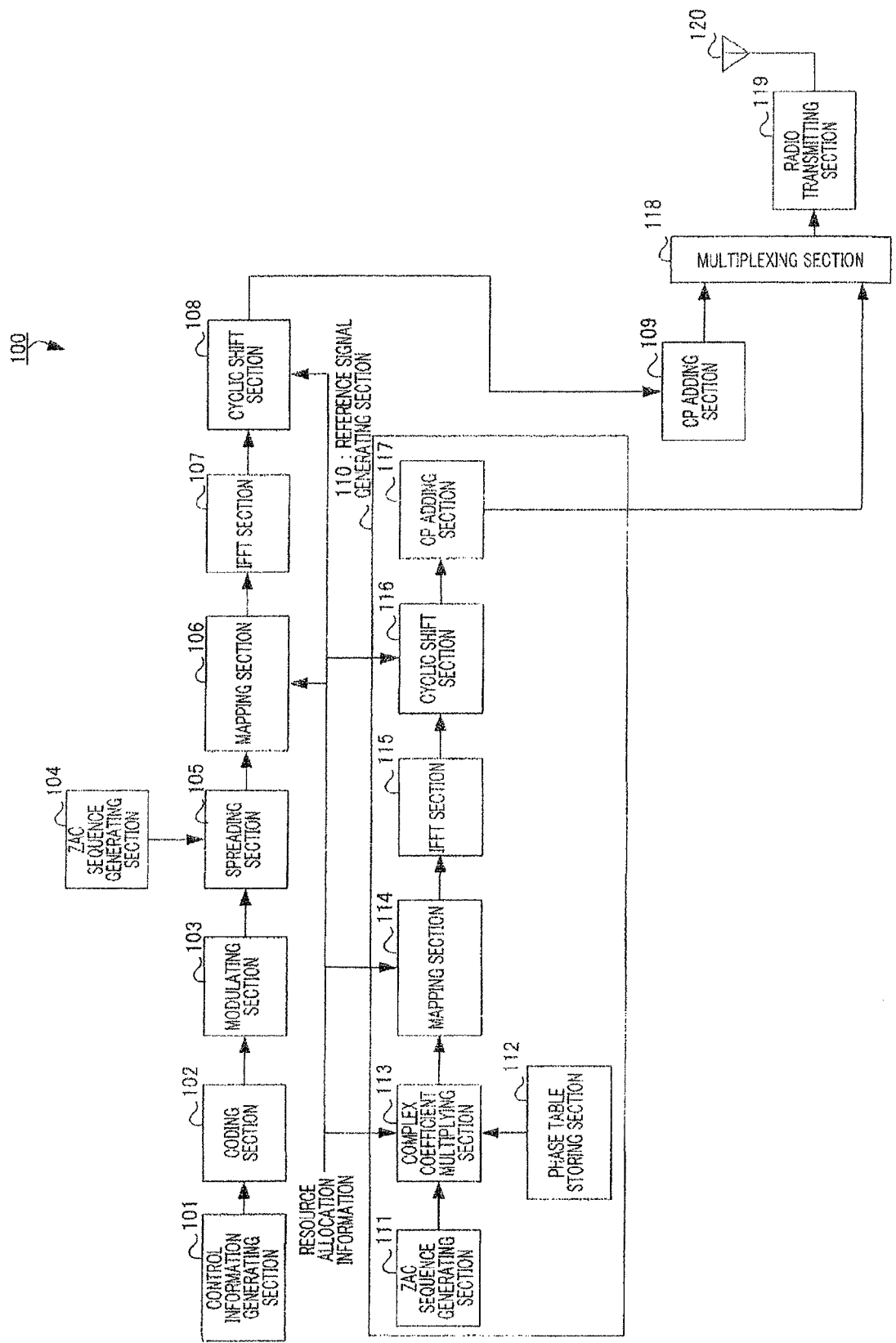
FIG. 8 is a block diagram showing a configuration of a terminal apparatus according to embodiment 1 of the present invention.

The configuration of terminal apparatus 100 according to embodiment 1 of the present invention will be explained with reference to FIG. 8. In FIG. 8, control information generating section 101 generates CQI signals based on downlink SIR (Signal to Interference Ratio) and so forth and outputs them to coding section 102. Coding section 102 encodes the control information outputted from control information generating section 101 and outputs the encoded control information to modulating section 103. Modulating section 103 modulates the coded control information outputted from coding section 102 and outputs the result to spreading section 105.

ZAC sequence generating section 104 generates ZAC sequences and outputs them to spreading section 105. Spreading section 105 spreads the control information outputted from modulating section 103 using ZAC sequences outputted from ZAC sequence generating section 104 and outputs the results to mapping section 106.

Mapping section 106 maps the signals outputted from spreading section 105, maps them to frequency resources designated by resource allocation information and outputs the mapped control signals to IFFT section 107. IFFT section 107 performs IFFT (Inverse Fast Fourier Transform) processing of the control information outputted from mapping section 106 and outputs the control information to which IFFT processing has been applied, to cyclic shift section 108. Cyclic shift section 108 performs cyclic shifting during a predetermined time length designated by resource allocation information and outputs the results to CP adding section 109. CP adding section 109 adds CPs (Cyclic prefixes) to signals outputted from cyclic shift section 108 and outputs the results to multiplexing section 118.

In reference signal generating section 110, ZAC sequence generating section 111 generates ZAC sequences and outputs them to complex coefficient multiplying section 113. Phase table storing section 112 stores a phase table associating complex coefficients by which reference signals are multiplied, with amounts of cyclic shift. Complex coefficient multiplying section 113 reads the stored complex coefficients. Here, the phase table will be described in detail later.

Complex coefficient multiplying section 113 reads complex coefficients corresponding to the amount of cyclic shifts (Cyclic shift indexes) designated by resource allocation information from phase table storing section 112, multiplies ZAC sequences by the read complex coefficients and outputs the results to mapping section 114.

Mapping section 114 maps ZAC sequences outputted from complex coefficient multiplying section 113 to frequency resources designated by resource allocation information and outputs the mapped signals to IFFT section 115. IFFT section 115 performs IFFT processing of ZAC sequences outputted from mapping section 114 and outputs the signals to which IFFT processing has been applied, to cyclic shift section 116.

Cyclic shift section 116 performs cyclic shifting for a predetermined time length designated by resource allocation information and outputs the results to CP adding section 117. CP adding section 117 adds CPs to the signals outputted from cyclic shift section 116 and outputs the results to multiplexing section 118.

Multiplexing section 118 time-multiplexes control information outputted from CP adding section 109 and reference signals outputted from CP adding section 117, and outputs the results to radio transmitting section 119. Radio transmitting section 119 performs transmission processing, including D/A conversion, up-conversion, amplification and so forth, of signals outputted from multiplexing section 118, and transmits the signals to which transmission processing has been applied, from antenna 120 by radio.

Next, the above-described phase table storing section 112 will be explained specifically. Phase table storing section 112 has a phase table associating cyclic shift indexes and complex coefficients {w1, w2} in table 1.

TABLE 1

| Cyclic shift index | w1 | w2 |
| --- | --- | --- |
| 0 | +1 | +1 |
| 1 | +1 | −1 |
| 2 | +1 | +1 |
| 3 | +1 | −1 |
| 4 | +1 | +1 |

TABLE 1-continued

| Cyclic shift index | w1 | w2 |
| --- | --- | --- |
| 5 | +1 | −1 |
| 6 | +1 | +1 |
| 7 | +1 | −1 |
| 8 | +1 | +1 |
| 9 | +1 | −1 |
| 10 | +1 | +1 |
| 11 | +1 | −1 |

Complex coefficient multiplying section 113 determines, for the second and sixth SC-FDMA symbols for transmitting reference signals, complex coefficients {w1, w2} corresponding to cyclic shift indexes (i=0, 1, . . . , 11) reported from the base station, from the phase table, and multiplies ZAC sequences outputted from ZAC sequence generating section 111 by the complex coefficients.

Figure 9:
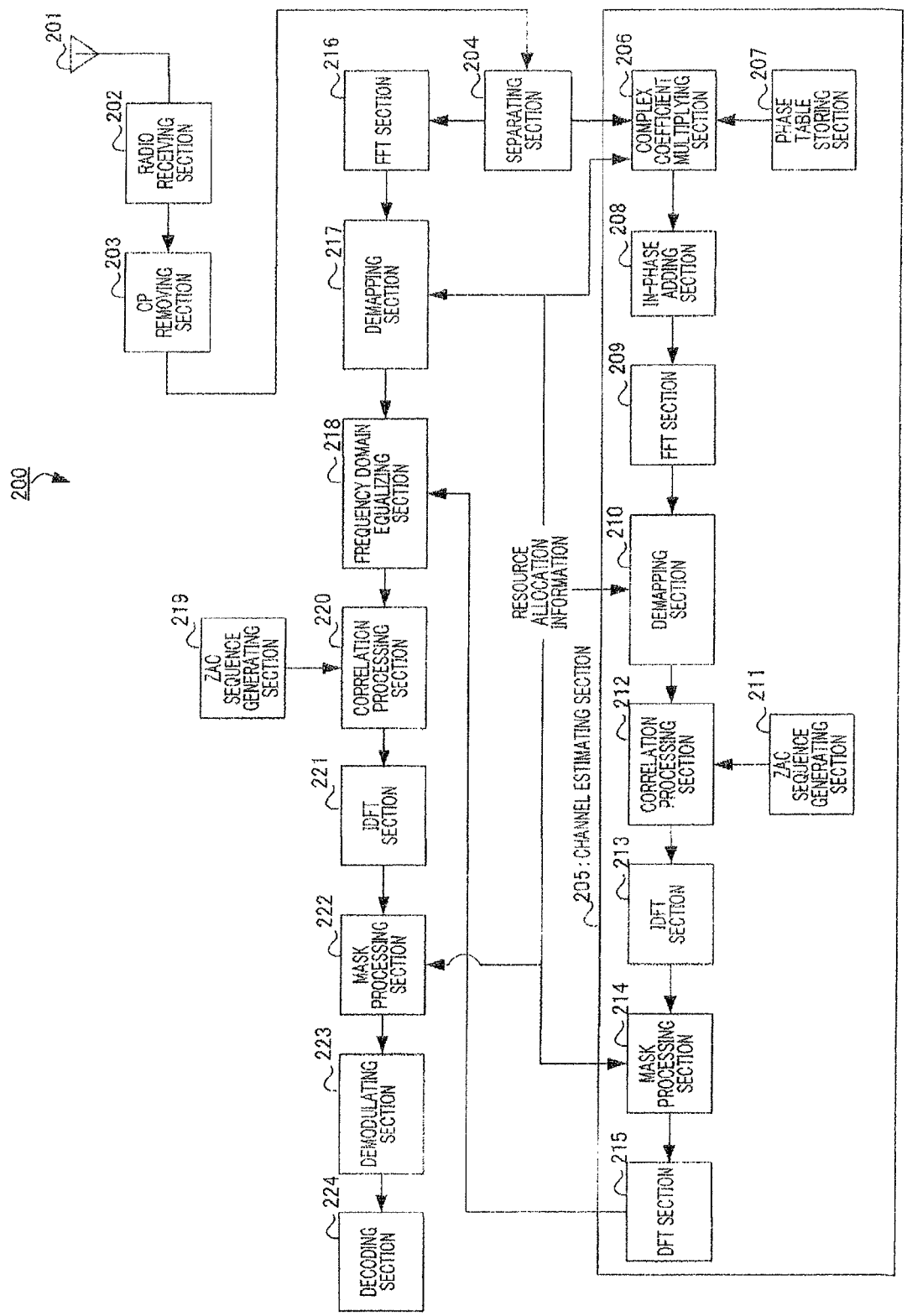
FIG. 9 is a block diagram showing a configuration of a base station apparatus according to embodiment 1.

Now, the configuration of base station apparatus 200 according to embodiment 1 of the present invention will be explained with reference to FIG. 9. In FIG. 9, radio receiving section 202 performs reception processing, including down-conversion, A/D conversion and so forth, of signals received via antenna 201 and outputs the results to CP removing section 203. CP removing section 203 removes the CPs of signals outputted from radio receiving section 202 and outputs the results to separating section 204. Separating section 204 separates signals outputted from CP removing section 203 into reference signals and control signals, outputs the resulting reference signals to complex coefficient multiplying section 206 and outputs the resulting control signals to FFT section 216.

In channel estimating section 205, complex coefficient multiplying section 206 reads complex coefficients corresponding to the amount of cyclic shift designated by resource allocation information from phase table storing section 207 and multiples reference signals outputted from separating section 204 using the read complex coefficients. To be more specific, the reference signals placed in the second and sixth SC-FDMA symbols are multiplied by the complex conjugates of the complex coefficients {w1, w2} multiplied in complex coefficient multiplying section 113 on the transmitting side. The reference signals by which the complex coefficients are multiplied, are outputted to in-phase adding section 208. Here, phase table storing section 207 has the same table as the table provided in phase table storing section 112 in terminal apparatus 100.

In-phase adding section 208 averages a plurality of reference signals in each slot outputted from complex coefficient multiplying section 206. That is, reference signals placed in the second and sixth SC-FDMA symbols are averaged (in-phase addition). The averaged reference signals are outputted to FFT section 209.

FFT section 209 performs FFT processing of reference signals outputted from in-phase adding section 208, transforms the resulting signals from time domain signals to frequency domain signals, and outputs the transformed frequency domain reference signals to demapping section 210. Demapping section 210 captures signals from frequency resources designated by resource allocation information and outputs the signals to correlation processing section 212.

ZAC sequence generating section 211 generates the same ZAC sequences as the ZAC sequences generated from terminal apparatus 100 and outputs them to correlation processing section 212. Then, correlation processing section 212 performs correlation computation using the ZAC sequences outputted from demapping section 210 and the ZAC sequences outputted from ZAC sequence generating section 211 and outputs the computation result to IDFT section 213. IDFT section 213 performs IDFT (Inverse Discrete Fourier Transform) processing of the signals outputted from correlation processing section 212, transforms the resulting signals from frequency domain signals to time domain signals and outputs the results to mask processing section 214. Mask processing section 214 extracts only the range in which there are signals of the desired wave, using the amount of cyclic shift allocated by terminal apparatus 100, and outputs the result to DFT section 215. DFT section 215 performs DFT processing of the correlation values outputted from mask processing section 214 and outputs the correlation values to which DFT processing has been applied, to frequency domain equalizing section 218. Here, the signals outputted from DFT section 215 represent frequency variation of channels and have the same channel estimation value for each of CQI symbols (the first, third, fourth, fifth and seventh SC-FDMA symbols) because channel estimation values are calculated by in-phase addition.

FFT section 216 performs FFT processing of control signals outputted from separating section 204, transforms the resulting signals from time domain signals to frequency domain signals and outputs the results to demapping section 217. Demapping section 217 captures signals from frequency resources designated by resource allocation information and outputs the signals to frequency domain equalizing section 218. Frequency domain equalizing section 218 performs equalization processing of control information outputted from demapping section 217 using the channel estimation values (estimation values of frequency variation caused in channels) outputted from channel estimating section 205 and outputs the signals to which equalization processing has been applied, to correlation processing section 220.

ZAC sequence generating section 219 generates the same sequences as the ZAC sequences generated by terminal apparatus 100 and outputs them to correlation processing section 220. Correlation processing section 220 performs correlation computation using control information outputted from frequency domain equalizing section 218 and ZAC sequences outputted from ZAC sequence generating section 219, and outputs the computation result to IDFT section 221. IDFT section 221 performs IDFT processing of signals outputted from correlation processing section 220, transforms the resulting signals from frequency domain signals to the time domain signals, and outputs them to mask processing section 222. Mask processing section 222 extracts only the range in which there are signals of the desired wave, using the amount of cyclic shift allocated in terminal apparatus 100, and outputs the result to demodulating section 223. Demodulating section 223 performs demodulation processing of control signals outputted from mask processing section 222 and outputs the signals to which demodulation processing has been applied, to decoding section 224. Decoding section 224 performs decoding processing of the signals to which demodulation processing has been applied, and extracts control signals.

As described above, it is possible to reduce interference from reference signals placed in adjacent cyclic shifts and therefore it is possible to improve the accuracy of channel estimation. Here, since the degree of improvement effect differs between in-phase addition and linear interpolation processing, each effect will be described individually.

First, with in-phase addition, since the phase of reference signals is changed in accordance with cyclic shift positions, it is possible to prevent in-phase interference between two reference signals, so that the SIR of reference signals is improved and therefore it is possible to improve the accuracy of channel estimation for all CQI symbols (the first, third, fourth, fifth and seventh SC-FDMA symbols).

Next, with linear interpolation processing, since it is possible to prevent in-phase interference between two reference signals, it is possible to reduce interference to CQI symbols (the third, fourth and fifth SC-FDMA symbols) sandwiched between reference signals by interpolation processing, so that it is possible to improve the accuracy of channel estimation. Here, although the interference power outside reference signals (the first and seventh SC-FDMA symbols) is increased by linear interpolation, the effect of reducing interference increases as the number of symbols (the third, fourth and fifth SC-FDMA symbols) inside reference signals increases. In addition, symbols outside reference signals are not subjected to interpolation processing, so that it is possible to prevent an increase in interference.

As described above, according to embodiment 1, the phase relationship between reference signals in each slot is changed by associating amounts of cyclic shift with complex coefficients {w1, w2} and multiplying reference signals by complex coefficients corresponding to amounts of cyclic shift, so that it is possible to reduce interference from reference signals placed in adjacent cyclic shifts, and therefore it is possible to improve the capability to receive CQIs and reference signals.

Here, with the present embodiment, although the phase table shown in table 1 is taken as an example, the relationship between even-numbered complex coefficients {w1, w2} and odd-numbered complex coefficients {w1, w2} may be switched as a phase table 2 shown in table. 2

TABLE 2

| Cyclic shift index | w1 | w2 |
|---|---|---|
| 0 | +1 | −1 |
| 1 | +1 | +1 |
| 2 | +1 | −1 |
| 3 | +1 | +1 |
| 4 | +1 | −1 |
| 5 | +1 | +1 |
| 6 | +1 | −1 |
| 7 | +1 | +1 |
| 8 | +1 | −1 |
| 9 | +1 | +1 |
| 10 | +1 | −1 |
| 11 | +1 | +1 |

Here, with the present embodiment, although the phase table shown in table 1 is taken as an example, {w1, w2}={+1, −1} in the odd-numbered cyclic shift indexes may be {w1, w2}={−1, +1} as a phase table 3 shown in table 3.

TABLE 3

| Cyclic shift index | w1 | w2 |
|---|---|---|
| 0 | +1 | +1 |
| 1 | −1 | +1 |
| 2 | +1 | +1 |
| 3 | −1 | +1 |
| 4 | +1 | +1 |
| 5 | −1 | +1 |
| 6 | +1 | +1 |
| 7 | −1 | +1 |
| 8 | +1 | +1 |
| 9 | −1 | +1 |

TABLE 3-continued

| Cyclic shift index | w1 | w2 |
| --- | --- | --- |
| 10 | +1 | +1 |
| 11 | −1 | +1 |

Here, with the present embodiment, although the phase table shown in table 1 is taken as an example, cyclic shifting may be used every N (here, N=1) sequences as a phase table 4 shown in table 4. In table 4, complex coefficients {w1, w2} are not associated with odd-numbered cyclic shifts.

TABLE 4

| Cyclic shift index | w1 | w2 |
| --- | --- | --- |
| 0 | +1 | +1 |
| 1 | −(N/A) | − |
| 2 | +1 | −1 |
| 3 | − | − |
| 4 | +1 | +1 |
| 5 | − | − |
| 6 | +1 | −1 |
| 7 | − | − |
| 8 | +1 | +1 |
| 9 | − | − |
| 10 | +1 | −1 |
| 11 | − | − |

Figure 10:
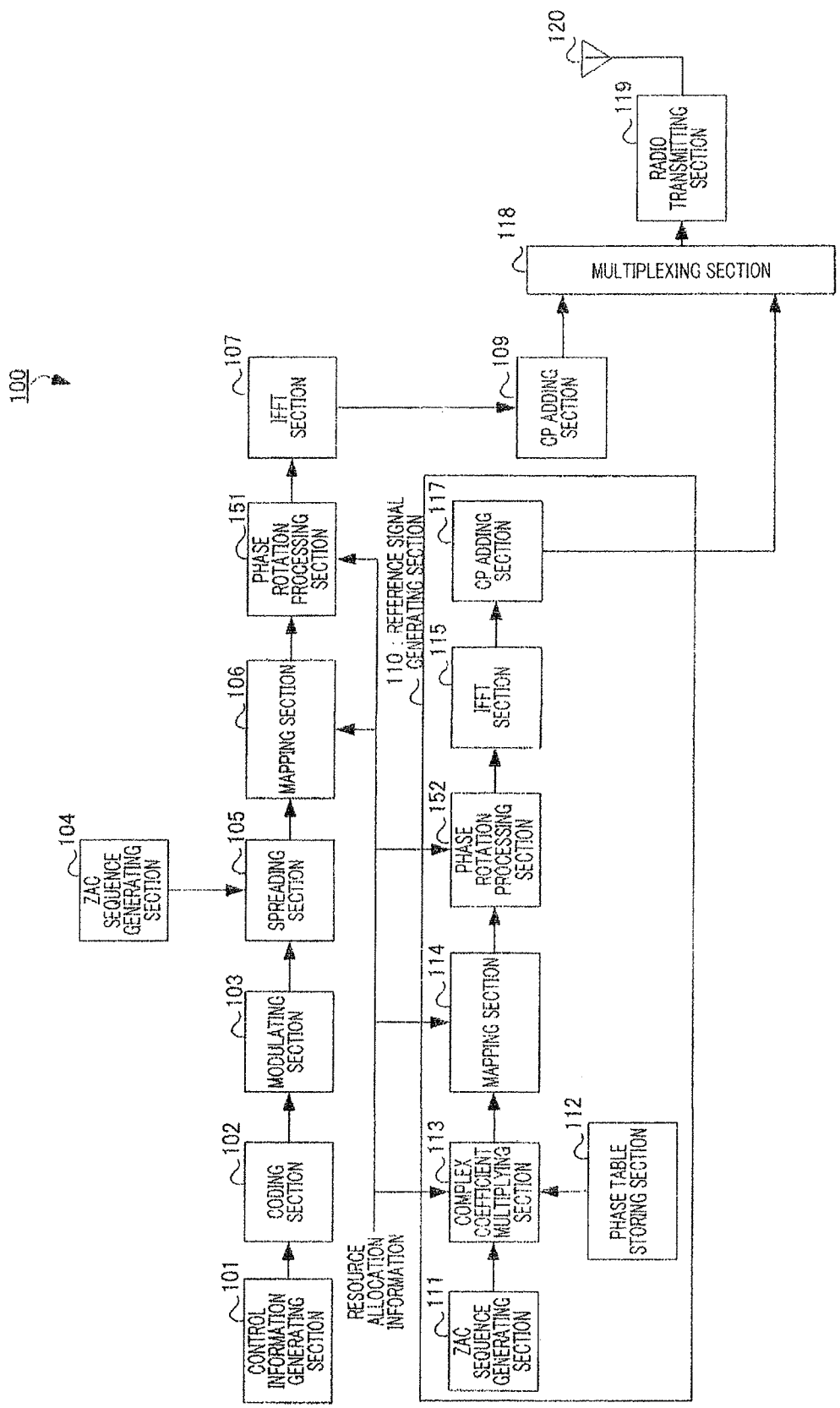
FIG. 10 is a block diagram showing another configuration of a terminal apparatus according to embodiment 1.
Figure 11:
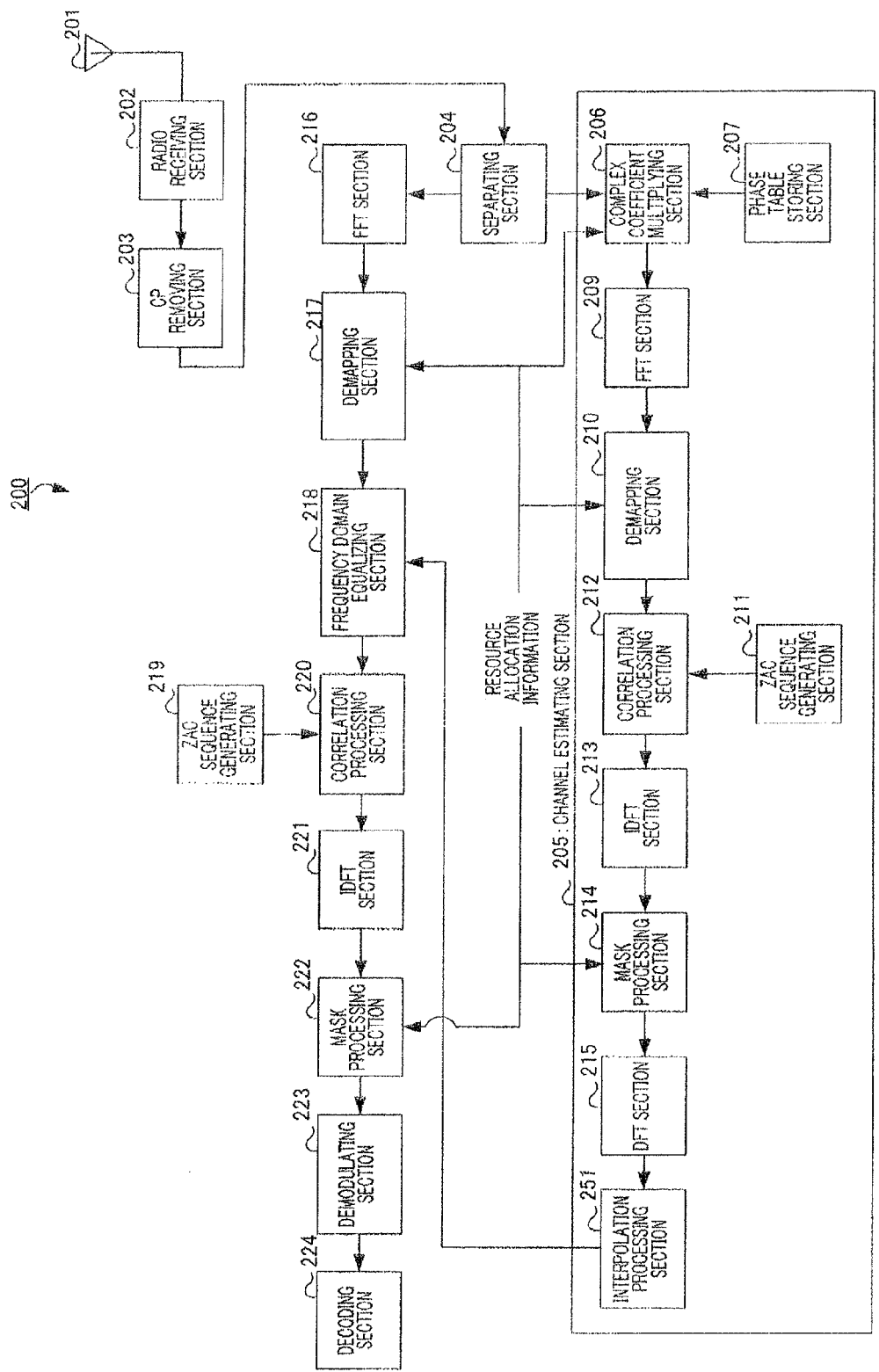
FIG. 11 is a block diagram showing another configuration of the base station apparatus according to embodiment 1.

Here, with the present embodiment, processing performed in the time domain in cyclic shift sections 108 and 116 in terminal section 100 as shown in FIG. 8 may be equally performed in the frequency domain in phase rotation processing sections 151 and 152 as phase rotation processing as shown in FIG. 10.

In addition, with the present embodiment, although a case has been explained where base station apparatus 200 calculates channel estimation values by in-phase addition processing as shown in FIG. 9, the present invention is not limited to this, and interpolation processing section 251 may calculate channel estimation values by linear interpolation processing. In a case of linear interpolation processing, channel estimation values for CQI symbols (the first, third, fourth, fifth and seventh SC-FDMA symbols) are calculated by linear interpolation processing using channel estimation values calculated based on the reference signals placed in the second and sixth SC-FDMA symbols.

In addition, with the present embodiment, although a case has been explained where equalization processing of data received in base station apparatus 200 is performed in the frequency domain, equalization processing may be performed in the time domain.

Moreover, with the present embodiment, although a SC-FDMA configuration has been used as an example for explanation, a OFDM (Orthogonal Frequency Division Multiplexing) configuration may be applicable.

Here, with the present embodiment, although one phase table is fixedly used, the phase table may be changed per cell or may be changed per system bandwidth.

Here, a case in which the phase table is changed by signaling will be explained briefly. Reference signals transmitted from the user at high power is likely to significantly interfere with not only adjacent cyclic shifts but also with cyclic shift positions N cyclic shifts apart. Therefore, the base station detects the presence or absence of users who transmit broadband SRSs (Sounding Reference Signals) and determines complex coefficients for CQI demodulating reference signals in accordance with cyclic shift positions. That is, the base station and terminals have a plurality of phase table patterns and switch between these tables by signaling.

In a case in which phase tables are changed by signaling, when the user transmits CQIs and broadband SRSs in the same subframe, the transmission power of SC-FDMA symbols for transmitting SRSs (the first SC-FDMA symbol or the seventh SC-FDMA symbol) is greater. Here, if the difference in transmission power between SRSs and CQIs increases, the output of the transmission amplifier does not stabilize. Therefore, CQI transmission power may be increased in order to be adapted to SRS transmission power.

Therefore, the base station determines complex coefficients for CQI demodulating reference signals in cyclic shift positions in accordance with the transmission power of users who use resources in the PUCCH field and designates phase tables used in terminals by signaling.

Embodiment 2

Figure 12:
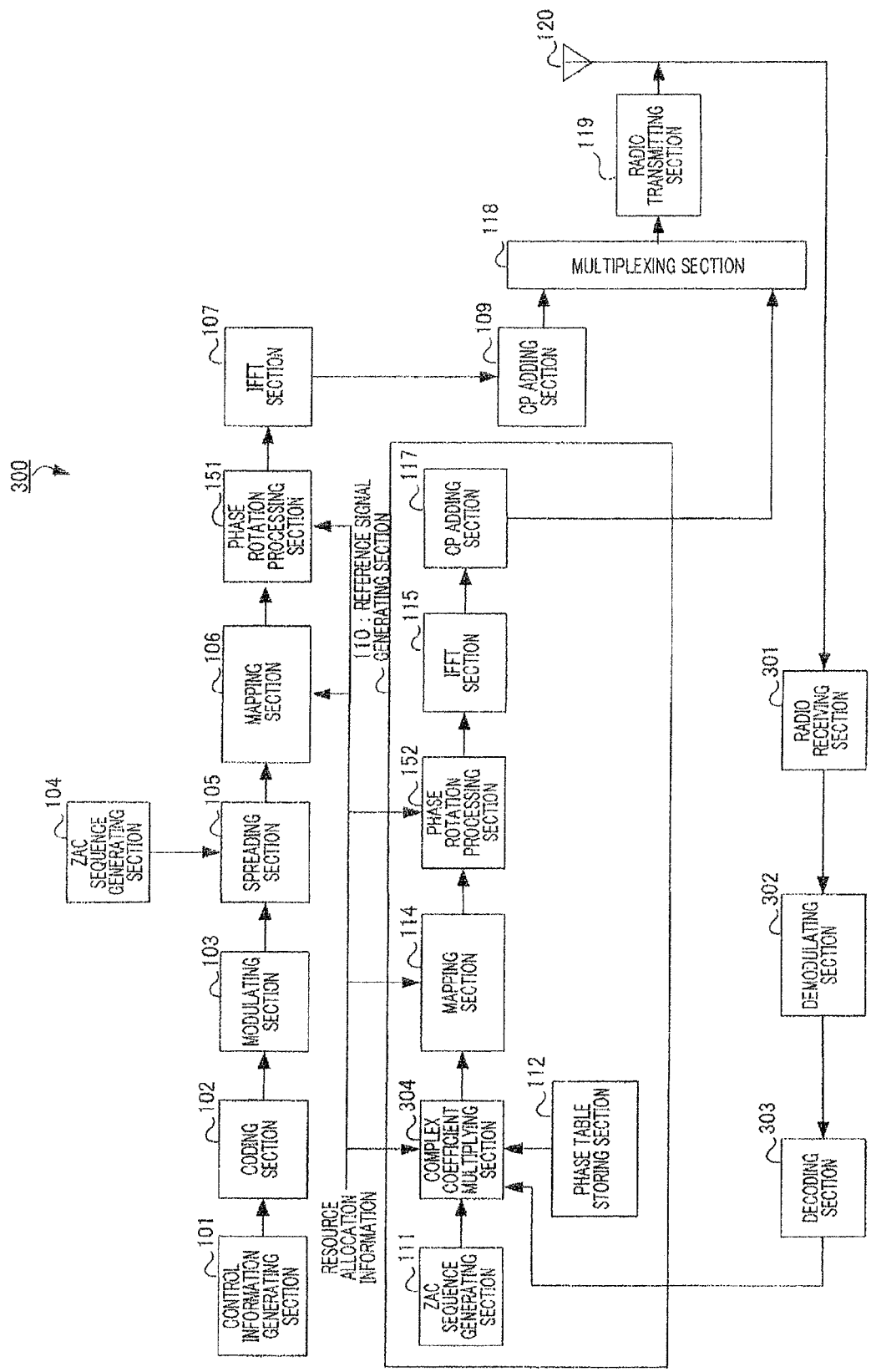
FIG. 12 is a block diagram showing a configuration of a terminal apparatus according to embodiment 2 of the present invention.

The configuration of terminal apparatus 300 according to embodiment 2 of the present invention will be explained with reference to FIG. 12. Here, FIG. 12 differs from FIG. 8 in that radio receiving section 301, demodulating section 302 and decoding section 303 are added, and complex coefficient multiplying section 113 is changed to complex coefficient multiplying section 304.

Radio receiving section 301 performs reception processing, including down-conversion, A/D conversion and so forth, of signals received via antenna 120, and outputs the resulting signals to demodulating section 302. Demodulating section 302 performs demodulation processing of the received signals outputted from radio receiving section 301, and outputs the received signals to which demodulation processing has been applied, to decoding section 303. Decoding section 303 performs decoding processing of the received signal to which demodulating processing has been applied, extracts phase switching signals, and outputs them to complex coefficient multiplying section 304.

Complex coefficient multiplying section 304 reads the complex coefficients corresponding to amounts of cyclic shift (Cyclic shift indexes) designated by resource allocation information from phase table storing section 112. In addition, complex coefficient multiplying section 304 switches the read complex coefficients based on phase switching signals outputted from decoding section 303.

To be more specific, when the phase switching signal is "0", complex coefficients read from the phase table are used. That is, when cyclic shift indexes are even numbers, the phase difference between reference signals in a slot is zero degrees (complex coefficient {w1, w2}={+1, +1}), and, when cyclic shift indexes are odd numbers, the phase difference between reference signals in a slot is 180 degrees (complex coefficient {w1, w2}={+1, −1}).

Meanwhile, when the phase switching signal is "1", complex coefficients, which have not been read from the phase table, are used. That is, when cyclic shift indexes are even numbers, the phase difference between reference signals in a slot is 180 degrees (complex coefficient {w1, w2}={+1, −1}), and, when cyclic shift indexes are odd numbers, the phase difference between reference signals in a slot is zero degrees (complex coefficient {w1, w2}={+1, +1}).

Figure 13:
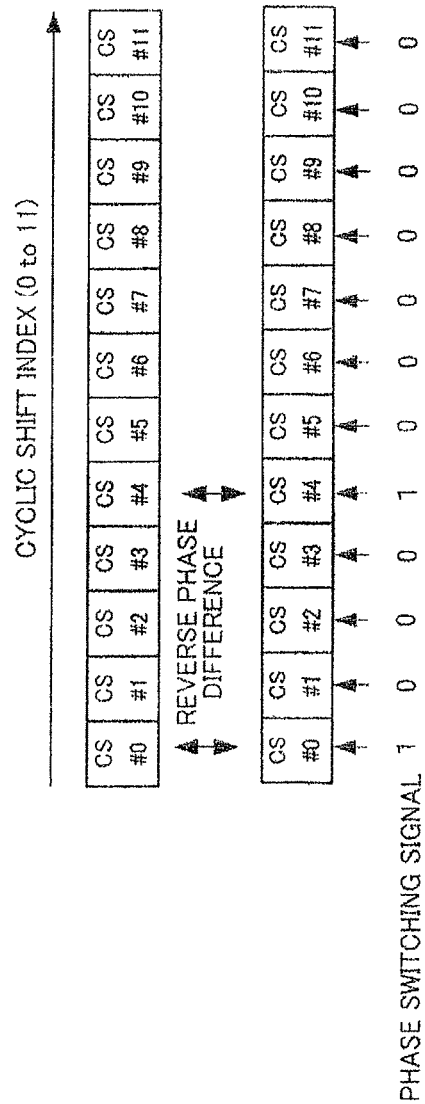
FIG. 13 is a drawing showing a state in which complex coefficients are switched according to phase switching signals.

For example, the phase switching signal "1" is transmitted to terminal apparatuses using the cyclic shift indexes 0 and 4, and the phase switching signal "0" is transmitted to terminal apparatuses using other cyclic shift indexes. This state is shown in FIG. 13.

As described above, complex coefficient multiplying section 304 switches complex coefficients in accordance with phase switching signals, multiplies ZAC sequences outputted from ZAC sequence generating section 111 by complex coefficients and outputs the results to mapping section 114.

Figure 14:
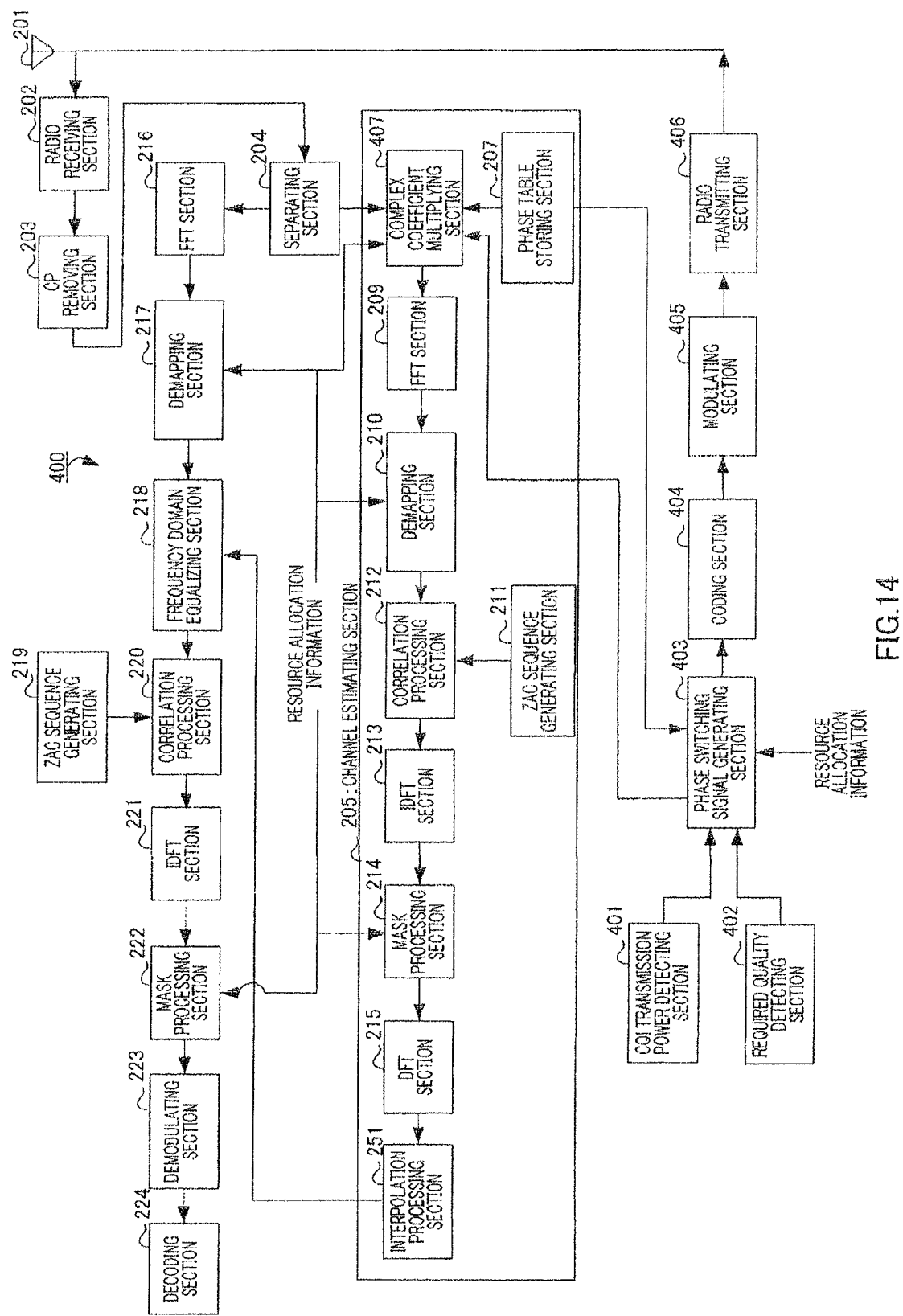
FIG. 14 is a block diagram showing a configuration of a base station apparatus according to embodiment 2 of the present invention.

Next, the configuration of base station apparatus 400 according to embodiment 2 of the present invention will be explained with reference to FIG. 14. Here, FIG. 14 differs from FIG. 9 in that CQI transmission power detecting section 401, required quality detecting section 402, phase switching signal generating section 403, coding section 404, modulating section 405 and radio transmitting section 406 are added, and complex coefficient multiplying section 406 is changed to complex coefficient multiplying section 407.

CQI transmission power detecting section 401 detects whether or not there is a user who transmits signals at higher power than other users transmitting broadband SRSs and CQIs in the same subframe, and, when there is the appropriate user, outputs information about the user to phase switching signal generating section 403.

Required quality detecting section 402 detects whether or not there is a user who requires a high quality as compared to other users transmitting CQIs and ACK/NACKs simultaneously, and when there is the appropriate user, outputs information about the user to phase switching signal generating section 403.

Phase switching signal generating section 403 generates phase switching signals using user information outputted from CQI transmission power detecting section 401, user information outputted from required quality detecting section 402, resource allocation information and phase tables. To be more specific, for example, CQI transmission power detecting section 401 and required quality detecting section 402 report that the transmission power of the user of CS #2 is high as shown in FIG. 13. Therefore, in order to reduce interference from CS #2, the phase switching signal "1" is generated for the users of CS #0 and CS #4, which are cyclic shift indexes two cyclic shifts apart from CS #2, and the phase switching signal "0" is generated for users of other cyclic shift indexes. The generated phase switching signals are outputted to coding section 404 and complex coefficient multiplying section 407.

Coding section 404 encodes the phase switching signals outputted from phase switching signal generating section 403 and outputs the resulting signals to modulating section 405. Modulating section 405 modulates the phase switching signals outputted from coding section 404 and outputs the resulting signals to radio transmitting section 406. Radio transmitting section 406 performs transmission processing, including D/A conversion, up-conversion, amplification and so forth, of the phase switching signals outputted from modulating section 405 and transmits the signals to which transmission processing has been applied, from antenna 201 by radio.

Complex coefficient multiplying section 407 reads the complex coefficients corresponding to amounts of cyclic shift designated by resource allocation information from phase table storing section 207. In addition, complex coefficient multiplying section 407 switches the read complex coefficients based on phase switching signals outputted from phase switching signal generating section 403.

As described above, according to embodiment 2, when there is a user who transmits broadband SRSs and CQIs in the same subframe, it is possible to make orthogonal not only reference signals placed in adjacent cyclic shift indexes to each other, but also reference signals placed in cyclic shift indexes one cyclic shift index apart by controlling complex coefficients read from phase tables, so that it is possible to improve the capability to receive CQIs and reference signals.

Embodiment 3

Figure 15:
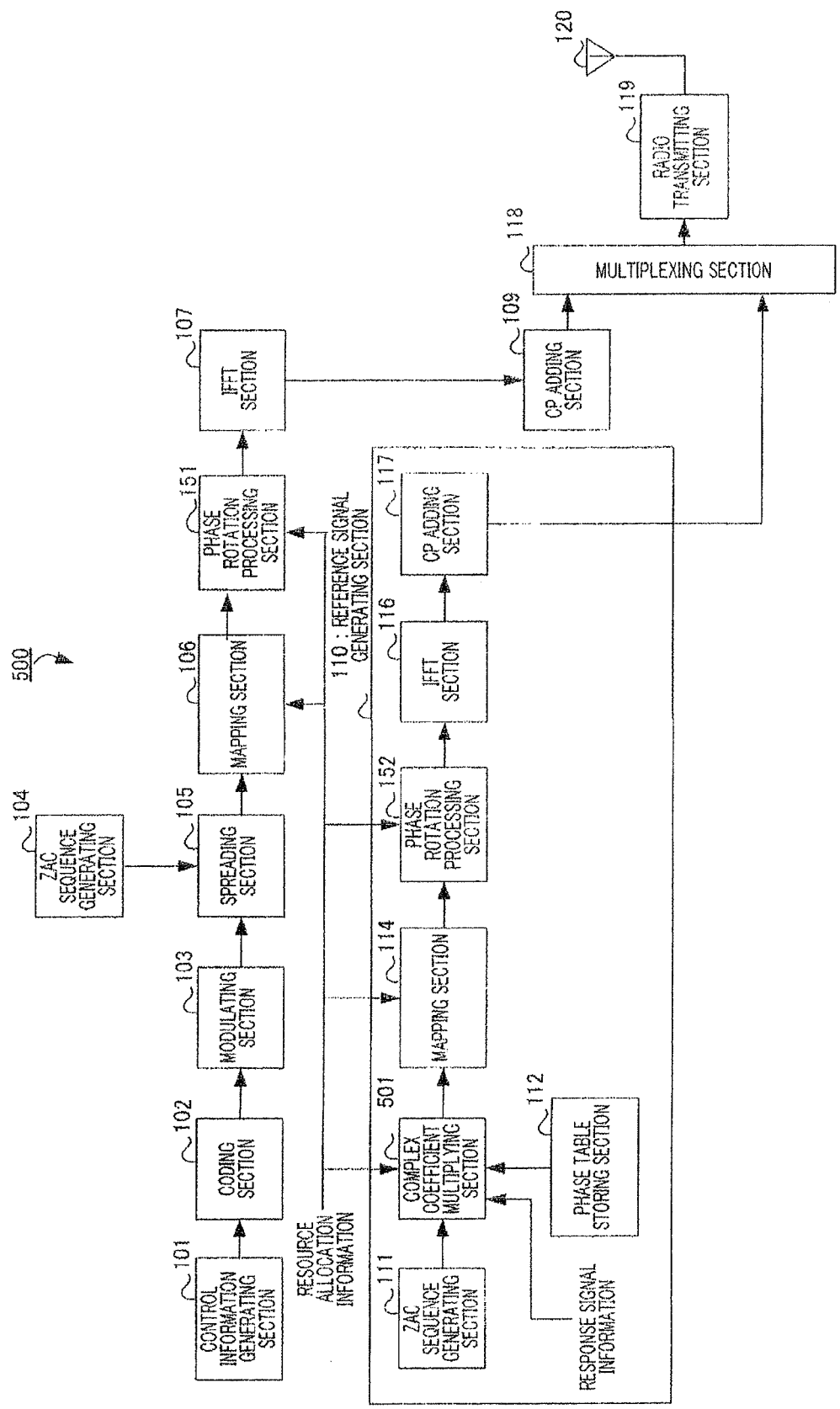
FIG. 15 is a block diagram showing a configuration of a terminal apparatus according to embodiment 3 of the present invention.

Now, the configuration of terminal apparatus 500 according to embodiment 3 will be explained with reference to FIG. 15. Here, FIG. 15 differs from FIG. 8 in that complex coefficient multiplying section 113 is changed to complex coefficient multiplying section 501.

Figure 16:
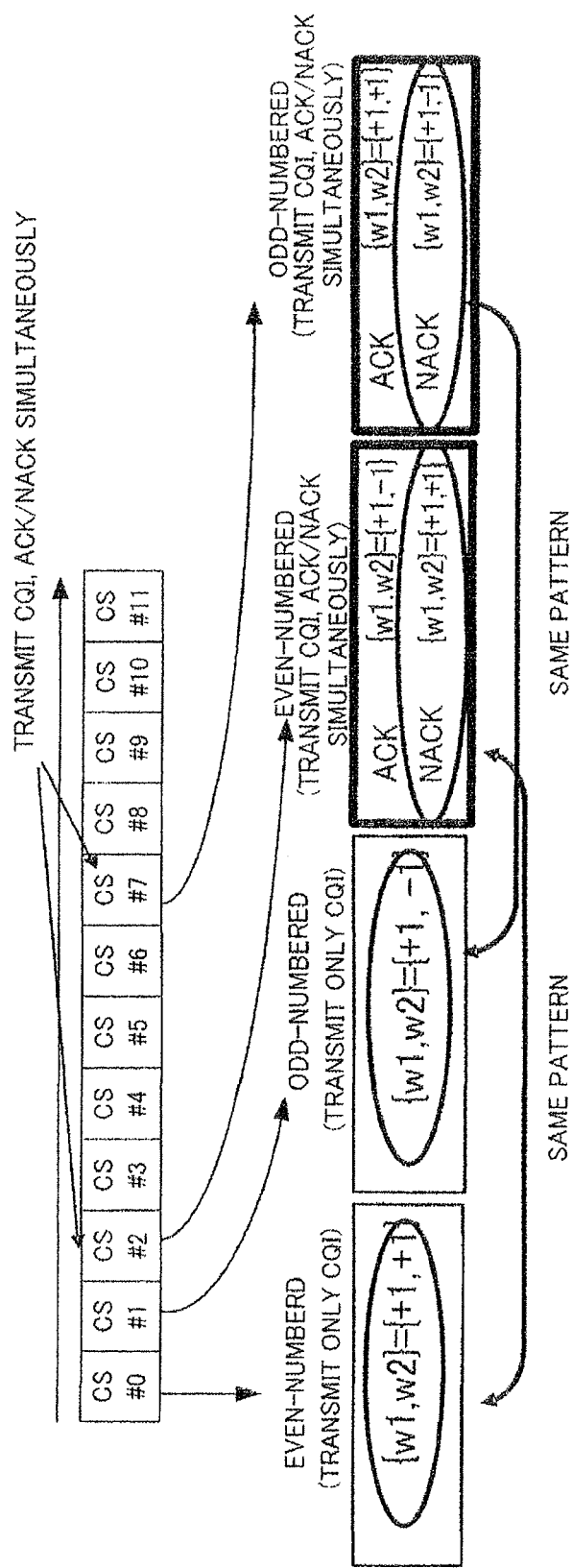
FIG. 16 is a drawing showing an example of allocation of complex coefficient patterns when CQIs and ACK/NACKs are transmitted simultaneously.

Complex coefficient multiplying section 501 determines complex coefficients in accordance with response signals (ACK/NACKs) of downlink received data. That is, when complex coefficients corresponding to cyclic shift indexes designated by resource allocation information are read from phase table storing section 112, and response signals are NACKs, read values (for example, $\{w1,w2\}=\{\pm 1, +1\}$, which make the phase difference between reference signals in a slot zero degrees when cyclic shift indexes are even numbers) are used as complex coefficients. In addition, in a case in which response signals are ACKs, different values from the read values (for example, $\{w1,w2\}=\{\pm 1, -1\}$, which make the phase difference between reference signals in a slot 180 degrees when cyclic shift indexes are even numbers) are used as complex coefficients. FIG. 16 shows an example of allocation of complex coefficient patterns when CQIs and ACK/NACKs are transmitted simultaneously.

Next, the configuration of base station apparatus 600 according to embodiment 3 of the present invention will be explained with reference to FIG. 17. Here, FIG. 17 differs from FIG. 9 in that response signal detecting section 601 is added.

Response signal detecting section 601 measures the power of reference signals, which are multiplied by complex coefficients assumed as ACK/NACK patterns (e.g. $\{w1, w2\}=\{+1, +1\}$, $\{+1, -1\}$) in multiplying section 206 and outputted from mask processing section 214, and detects whether or not the measured power exceeds a certain threshold. When the measured power does not exceed the threshold, the step returns to complex coefficient multiplying section 206, and coefficient multiplying section 206 multiplies reference signals by a different phase pattern and response signal detecting section 601 detects whether or not the power exceeds the threshold. When the measured power exceeds the threshold, response signal detecting section 601 detects whether signals are ACKs or NACKs based on the multiplied phase pattern. When the power does not exceed the threshold in all assumed patterns, DTX detection will be performed.

As described above, since the base station apparatus cannot clearly recognize which pattern is used as ACKs or NACKs in the terminal apparatus, response signal detecting section 601 detects the threshold of the power of reference signals by which phase patterns are multiplied, so that it is possible to specify patterns used as ACKs and NACKs in the terminal apparatus.

Here, since CQIs are transmitted only once per several ms, CQIs and ACK/NACKs are less likely to be transmitted simultaneously. That is, a user who transmits simultaneously CQIs and ACK/NACKs using given cyclic shifting is highly likely to transmit only CQIs in adjacent cyclic shift indexes. Therefore, it is possible to improve the capability to receive NACKs whose required quality is higher than that of ACKs by allocating complex coefficients allowing reduction of interference from adjacent cyclic shift indexes to NACKs and allocating complex coefficients not allowing reduction of interference from adjacent cyclic shift indexes to ACKs. Here, 3GPP-LTE has discussed the required quality of an ACK and a NACK. The BLER (Block Error Rates) of an ACK is $10^{-1}$ to $10^{-2}$ and that of a NACK is $10^{-3}$ to $10^{-4}$.

As described above, according to embodiment 3, it is possible to improve the capability to receive NACKs whose required quality is higher by making the complex coefficient pattern allocated to NACKs transmitted in synchronization with CQIs orthogonal to the complex coefficient pattern by which reference signals for transmitting only CQIs are multiplied when CQIs and ACK/NACKs are transmitted simultaneously.

Figure 17:
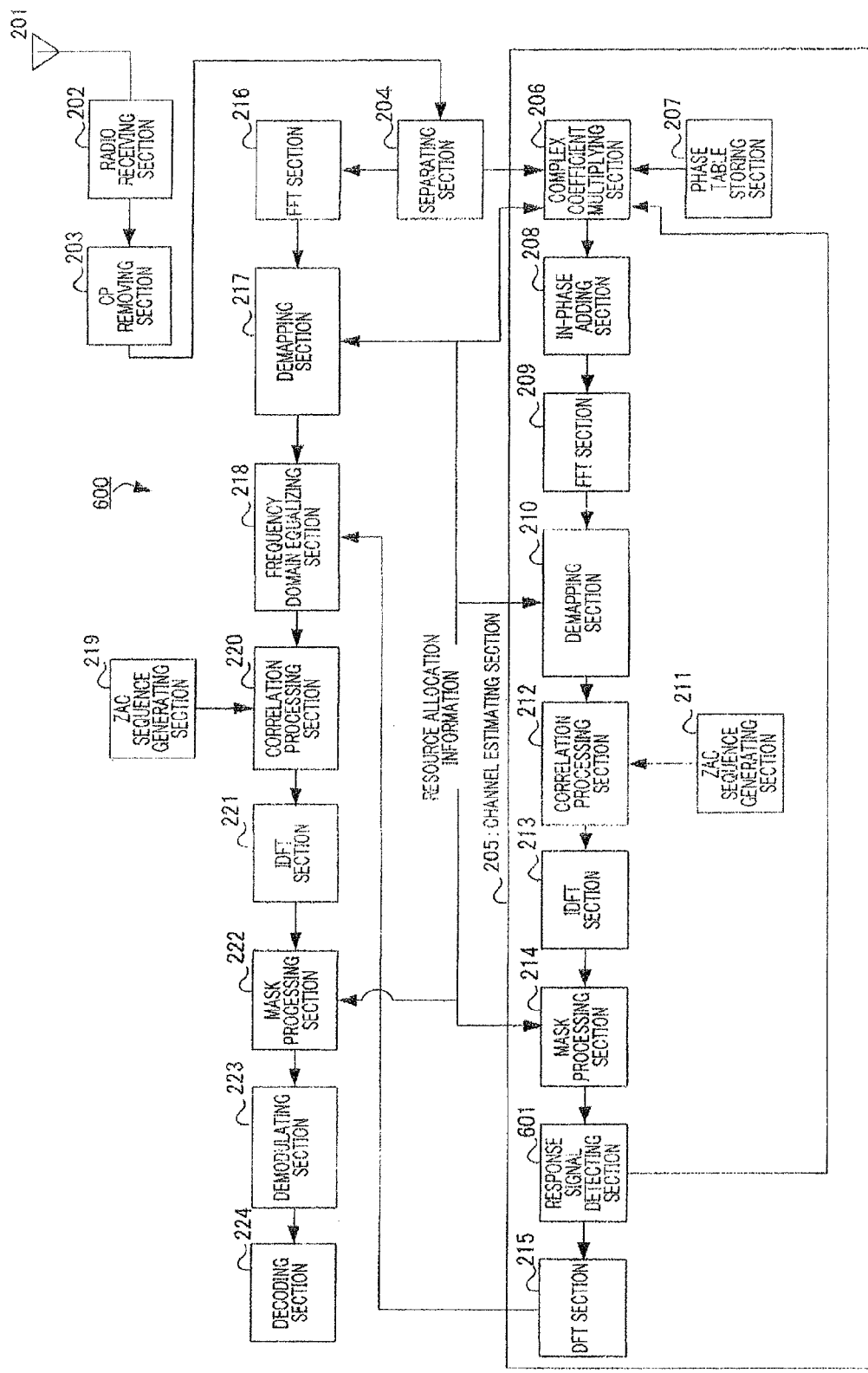
FIG. 17 is a block diagram showing a configuration of a base station apparatus according to embodiment 3 of the present invention.

Here, with the present embodiment, although a case has been described where feedback is transmitted from response signal detecting section 601 in the base station apparatus to complex coefficient multiplying section 206 as shown in FIG. 17, this feedback may not be transmitted. In this case, response signal detecting section 601 measures power of reference signals, detects ACKs (NACKs) when the power exceeds the threshold and detects NACKs (ACKs) when the power does not exceed the threshold.

In addition, with the present embodiment, although a case has been explained where response signal detecting section 601 detects power values, response signal detecting section 601 may perform quadrant detection.

Moreover, with the present embodiment, although an example of in-phase addition in a base station apparatus has been used, linear interpolation processing may be performed as described with embodiment 1.

Here, with each above-described embodiment, CQIs have been used as an example of information to be transmitted, the present invention is not limited to this, and data and so forth may be applicable.

Moreover, with each above-described embodiment, although a case has been explained where there are two reference signals in one slot, the present invention is limited to this, and there may be three or more reference signals in one slot.

Moreover, with each above-described embodiment, although a unit in which reference signals used for one channel estimation are placed is referred to as a slot, the unit may be referred to as "frame" and "sub frame".

Moreover, sequences for reference signals may be quadrature sequences such as GCL/ZC sequences, as well as ZAC sequences.

Moreover, although cases have been described with the embodiments above where the present invention is configured by hardware, the present invention may be implemented by software.

Each function block employed in the description of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-000197, filed on Jan. 4, 2008, including the specification, drawings and abstract, is incorporated herein by reference in its entirety.

INDUSTRIAL APPLICABILITY

The radio communication terminal apparatus and the radio transmission method according to the present invention allows improvement of the capability to receive CQIs and reference signals, and is applicable to a mobile communication apparatus and so forth.

The invention claimed is:

1. A communication apparatus comprising:
a receiver which, in operation, receives a reference signal, which is generated at a terminal apparatus using an index related to a cyclic shift and a pair of coefficients in accordance with a selection signal, wherein the selection signal selects one of a first correspondence relationship and a second correspondence relationship, each defining a relationship between the index related to a cyclic shift and the pair of coefficients, the first correspondence relationship defines a first pair of coefficients corresponding to an even number index related to a cyclic shift and a second pair of coefficients corresponding to an odd number index related to a cyclic shift and the second correspondence relationship defines the first pair of coefficients corresponding to the odd number index related to a cyclic shift and the second pair of coefficients corresponding to the even number index related to a cyclic shift; and
an estimator which, in operation, estimates a channel estimation value using the reference signal.

2. The communication apparatus according to claim 1, wherein the first pair of coefficients is [1 1], and the second pair of coefficients is [1 −1].

3. The communication apparatus according to claim 1, wherein the reference signal is generated at the terminal apparatus by determining a pair of complex coefficients according to a table showing a relationship between indexes related to the cyclic shift and pairs of coefficients and by multiplying a signal sequence by the determined pair of complex coefficients.

4. A reception method comprising:
receiving a reference signal, which is generated at a terminal apparatus using an index related to a cyclic shift and a pair of coefficients in accordance with a selection signal, wherein the selection signal selects one of a first correspondence relationship and a second correspondence relationship, each defining a relationship between the index related to a cyclic shift and the pair of coefficients, the first correspondence relationship defines a first pair of coefficients corresponding to an even number index related to a cyclic shift and a second pair of coefficients corresponding to an odd number index related to a cyclic shift and the second correspondence relationship defines the first pair of coefficients corresponding to the odd number index related to a cyclic shift and the second pair of coefficients corresponding to the even number index related to a cyclic shift; and
estimating a channel estimation value using the reference signal.

5. The reception method according to claim 4, wherein the first pair of coefficients is [1 1], and the second pair of coefficients is [1 −1].

6. The reception method according to claim 4, wherein the reference signal is generated at the terminal apparatus by determining a pair of complex coefficients according to a table showing a relationship between indexes related to the cyclic shift and pairs of coefficients and by multiplying a signal sequence by the determined pair of complex coefficients.

* * * * *